US 12,505,508 B2

United States Patent
Agrawal et al.

(10) Patent No.: US 12,505,508 B2
(45) Date of Patent: Dec. 23, 2025

(54) DIGITAL IMAGE RADIAL PATTERN DECODING SYSTEM

(71) Applicant: Adobe Inc., San Jose, CA (US)

(72) Inventors: Vivek Agrawal, Noida (IN); Vineet Agarwal, Guwahati (IN); Tarun Beri, Noida (IN); Matthew David Fisher, Burlingame, CA (US)

(73) Assignee: Adobe Inc., San Jose, CA (US)

( * ) Notice: Subject to any disclaimer, the term of this patent is extended or adjusted under 35 U.S.C. 154(b) by 153 days.

(21) Appl. No.: 18/301,398

(22) Filed: Apr. 17, 2023

(65) Prior Publication Data

US 2024/0346621 A1 Oct. 17, 2024

(51) Int. Cl.
| G06T 3/00 | (2024.01) |
| G06T 3/40 | (2006.01) |
| G06T 3/60 | (2006.01) |
| G06T 5/20 | (2006.01) |
| G06T 5/70 | (2024.01) |

(52) U.S. Cl.
CPC ............. *G06T 3/60* (2013.01); *G06T 3/40* (2013.01); *G06T 5/20* (2013.01); *G06T 5/70* (2024.01)

(58) Field of Classification Search
CPC .... G06T 3/60; G06T 3/40; G06T 5/20; G06T 5/70; G06T 3/00
See application file for complete search history.

(56) References Cited

U.S. PATENT DOCUMENTS

| 6,269,177 | B1 | 7/2001 | Dewaele et al. | |
| 7,667,699 | B2* | 2/2010 | Komar | G06T 3/047 715/848 |
| 8,106,927 | B2* | 1/2012 | Shoemaker | G06T 3/047 345/665 |
| 8,699,851 | B2 | 4/2014 | Brasnett et al. | |
| 9,501,681 | B1* | 11/2016 | Wang | G06K 7/1417 |
| 10,078,884 | B2* | 9/2018 | Jäckle | G06T 3/053 |
| 12,367,658 | B2 | 7/2025 | Beri et al. | |
| 2007/0154072 | A1 | 7/2007 | Taraba et al. | |
| 2015/0187126 | A1* | 7/2015 | Magder | G06T 15/04 345/426 |

(Continued)

OTHER PUBLICATIONS

Bay, Herbert, et al., "SURF: Speeded Up Robust Features", Computer Vision and Image Understanding (CVIU), vol. 110, No. 3 [retrieved Apr. 1, 2023]. Retrieved from the Internet <http://www.cs.tau.ac.il/~turkel/imagepapers/surf.pdf>., 2008, 14 pages.

(Continued)

*Primary Examiner* — Xiao M Wu
*Assistant Examiner* — George Renze
(74) *Attorney, Agent, or Firm* — FIG. 1 Patents (57) ABSTRACT

A digital image radial pattern decoding system is described. In one example, an unfolded digital image is formed by the radial pattern decoding system by unfolding a radial pattern in a digital image. An inflated digital image is then generated by the radial pattern decoding system by upsampling the unfolded radial pattern. A grid pattern is determined by the radial pattern decoding system based on the inflated digital image. A radial pattern cell is then generated based on a reverse transform of the grid pattern. A visual pattern is generated by the radial pattern decoding system based on the radial pattern cell.

20 Claims, 8 Drawing Sheets

(56) References Cited

U.S. PATENT DOCUMENTS

| | | |
|---|---|---|
| 2017/0193332 A1* | 7/2017 | Kim .......................... G06T 5/20 |
| 2017/0206638 A1* | 7/2017 | Fainstain ................ G06T 19/20 |
| 2019/0199995 A1* | 6/2019 | Yip ...................... H04N 13/161 |
| 2024/0096062 A1 | 3/2024 | Beri et al. |

OTHER PUBLICATIONS

Beri, Tarun, et al., "US Application as Filed", U.S. Appl. No. 17/932,478, filed Sep. 15, 2022, 81 pages.

Calonder, Michael, et al., "BRIEF: Binary Robust Independent Elementary Features", Computer Vision—ECCV 2010 Lecture Notes in Computer Science, vol. 6314 [retrieved Apr. 1, 2023]. Retrieved from the Internet <http://viplab.fudan.edu.cn/vip/attachments/download/1864/BRIEF.pdf>., 2010, 14 Pages.

Hyndman, Rob J, et al., "Another look at measures of forecast accuracy", International Journal of Forecasting, vol. 22, No. 4 [retrieved Apr. 1, 2023]. Retrieved from the Internet <https://www.monash.edu/business/econometrics-and-business-statistics/research/publications/ebs/wp13-05.pdf>., May 2006, 19 Pages.

Lowe, David G, "Distinctive Image Features from Scale-Invariant Keypoints", International Journal of Computer Vision [retrieved Apr. 1, 2023]. Retrieved from the Internet <https://www.cse.unr.edu/~bebis/CS773C/ObjectRecognition/Papers/Lowe04.pdf>., Jan. 5, 2004, 21 Pages.

Neubeck, Alexander, et al., "Efficient Non-Maximum Suppression", 18th International Conference on Pattern Recognition (ICPR'06) [retrieved Apr. 1, 2023]. Retrieved from the Internet <http://lars.mec.ua.pt/public/LAR%20Projects/Perception/2013_PedroSilva/Disserta%C3%A7%C3%A30/Papers/Neubeck-NMS.pdf>., Aug. 2006, 6 Pages.

Rublee, Ethan, et al., "ORB: An efficient alternative to SIFT or SURF", International Conference on Computer Vision [retrieved Apr. 1, 2023]. Retrieved from the Internet <http://dev.ipol.im/~reyotero/bib/bib_all/2011_Rublee_Rabaud_ORB_alternative_to_sift_surf_willGarag_ICCV.pdf>., Nov. 2011, 8 Pages.

"Non-Final Office Action", U.S. Appl. No. 17/932,478, filed Mar. 13, 2025, 8 pages.

"Notice of Allowance", U.S. Appl. No. 17/932,478, filed May 27, 2025, 7 pages.

* cited by examiner

DIGITAL IMAGE RADIAL PATTERN DECODING SYSTEM

BACKGROUND

Visual patterns are incorporated in a wide variety of content. Physical examples include use on physical objects "in the real world" such as wallpapers, murals, floor tiles, t-shirts, flowerpots, carpeting, and so forth. Digital examples include use by a computing device and online examples such as webpages, album art, video games, application user interfaces, and so forth. Conventional techniques used to create and implement visual patterns, however, are typically developed for a dedicated scenario as a "on off" and thus limit subsequent editing, arrangement, styling, and use.

SUMMARY

A digital image radial pattern decoding system is described. In one example, an unfolded digital image is formed by the radial pattern decoding system by unfolding a radial pattern in a digital image. An inflated digital image is then generated by the radial pattern decoding system by upsampling the unfolded radial pattern. A grid pattern is determined by the radial pattern decoding system based on the inflated digital image. A radial pattern cell is generated based on a reverse transform of the grid pattern. A visual pattern is generated by the radial pattern decoding system based on the radial pattern cell.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Visual patterns may be found in a variety of scenarios, from wallpapers to murals, from floor tiles to t-shirts, flowerpots to office spaces, webpages, application backgrounds, and so forth. In typical real-world scenarios, visual patterns are often created as raster graphics using dedicated image domain software. Consequently, these visual patterns encounter several limitations and technical challenges, including implementation in a particular resolution, do not support subsequent editing of the visual pattern (e.g., to serve as a basis to create a new visual pattern), and so forth.

To address these technical challenges, a radial pattern decoding system is described. The radial pattern decoding system is configured to address scenarios in which the visual pattern is radially repeated by deciphering a configuration of a radial pattern cell as a minimal repeatable unit from an input digital image. The radial pattern cell is then convertible by the radial pattern decoding system into a radial vector pattern, which supports editing, resizing, and implementation as a basis to form a variety of different combinations as an overall visual pattern. These techniques are numerically stable, exhibit high performance, and generate a high-quality output.

As part of achieving numerical stability, transformations are applied by the radial pattern decoding system to the input digital image for configuration as part of a transformed space that supports processing as a rectangular pattern. With rectangular patterns, each pixel is addressable as an integral position, versus a real number as involved in radial patterns that introduce issues involving floating point computations. As a result, the techniques described herein improve computing device operation and accuracy.

Transformations applied by the radial pattern decoding system, in one or more examples, include an unfold transformation, an inflation transformation, and a smoothing transformation. The unfold transformation is used by the radial pattern decoding system to convert a radial pattern into an unfolded radial pattern. The unfolded radial pattern is represented as an inverted triangle in which each image row of the inverted triangle corresponds to a radial arc from the radial pattern. The inflation transformation is then used to convert the inverted triangle of the unfolded radial pattern into an inflated digital image formed as a rectangle such that image rows from the unfolded radial pattern are upsampled to have a uniform size, i.e., length. A smoothing transformation is utilized in one or more examples to dampen image artifacts.

A grid pattern generation module is then utilized by the radial pattern decoding system to determine a grid pattern from the smoothed digital image, which includes a grid pattern cell (e.g., as the repeatable visual unit) and a grid configuration. A reverse transformation module is utilized to map the grid pattern cell back to the radial domain as a radial pattern cell (e.g., based on coordinates of the grid pattern cell and pixels from the input digital image), which is configured as a pie-shaped cell (e.g., as a series of arcs) that represents a minimal unit of repetition for forming a visual pattern.

In an implementation, the radial pattern cell is converted by a vector generation module into a radial vector pattern in support of increased editing functionality. These techniques support for digital images having multiple radial patterns placed inside one another to form a complete visual pattern. In this way, the radial pattern decoding system supports generation of a radial pattern cell as a minimal repeatable unit usable to form a variety of visual pattern configurations, which is not possible in conventional techniques. Further discussion of these and other examples is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

Figure 1:
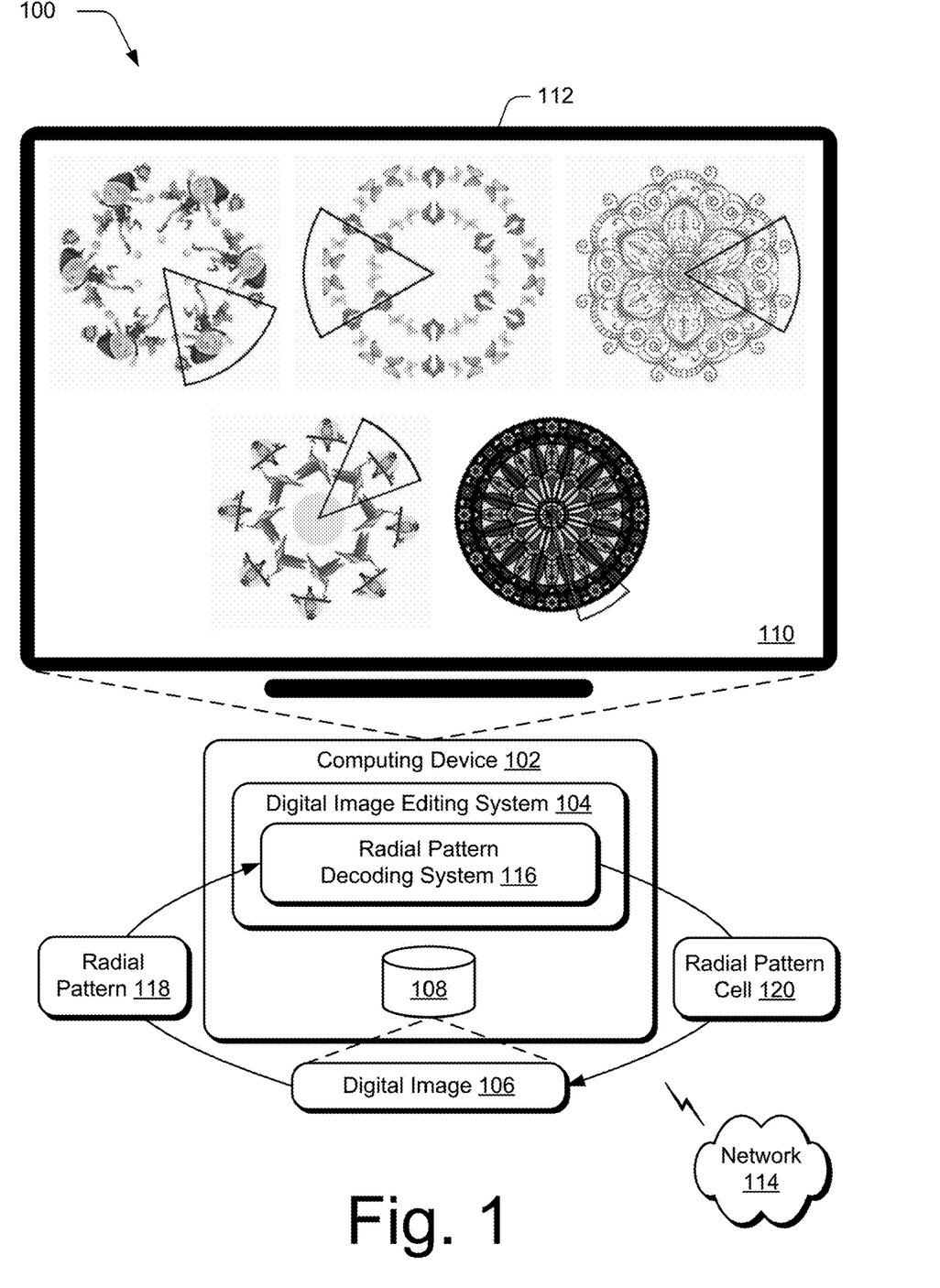
FIG. 1 is an illustration of a digital medium environment in an example implementation that is operable to employ digital image radial pattern decoding techniques described herein.

FIG. 1 is an illustration of a digital medium environment 100 in an example implementation that is operable to employ digital image radial pattern decoding techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 9.

The computing device 102 is illustrated as including a digital image editing system 104. The digital image editing system 104 is implemented at least partially in hardware of the computing device 102 to process and transform a digital image 106, which is illustrated as maintained in a storage device 108 of the computing device 102. Examples of digital images 106 include raster digital images (e.g., bitmaps) and vector digital images configurable in a variety of formats, such as a portable document format, jpeg, and so forth. Examples of image processing includes creation of the digital image 106, modification of the digital image 106, and rendering of the digital image 106 in a user interface 110 for output, e.g., by a display device 112. Although illustrated as implemented locally at the computing device 102, functionality of the digital image editing system 104 is also configurable as whole or part via functionality available via the network 114, such as part of a web service or "in the cloud."

An example of functionality incorporated by the digital image editing system 104 to process the digital image 106 is illustrated as a radial pattern decoding system 116. The radial pattern decoding system 116 is configured to detect a radial pattern 118 within a digital image 106, and from this, generate a radial pattern cell 120 as a repeatable unit usable to generate other visual patterns. Example of use of radial pattern cells to generate visual patterns are depicted in the user interface 110 as a wedge shape (i.e., pie shape) that is repeated to form a corresponding visual pattern. Further discussion of operation of the radial pattern decoding system in generating the radial pattern cell 120 is included in the following section and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Radial Pattern Decoding System

The following discussion describes radial pattern decoding techniques that are implementable utilizing the described systems and devices. Aspects of the procedure are implemented in hardware, firmware, software, or a combination thereof. The procedure is shown as a set of blocks that specify operations performable by hardware and are not necessarily limited to the orders shown for performing the operations by the respective blocks. Blocks of the procedure, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform the algorithm. FIG. 8 is a flow diagram depicting an algorithm as a step-by-step procedure 800 in an example implementation of operations performable for accomplishing a result of radial pattern decoding from a digital image. In portions of the following discussion, reference will be made to FIGS. 1-7 in parallel with the procedure 800 of FIG. 8.

Figure 2:
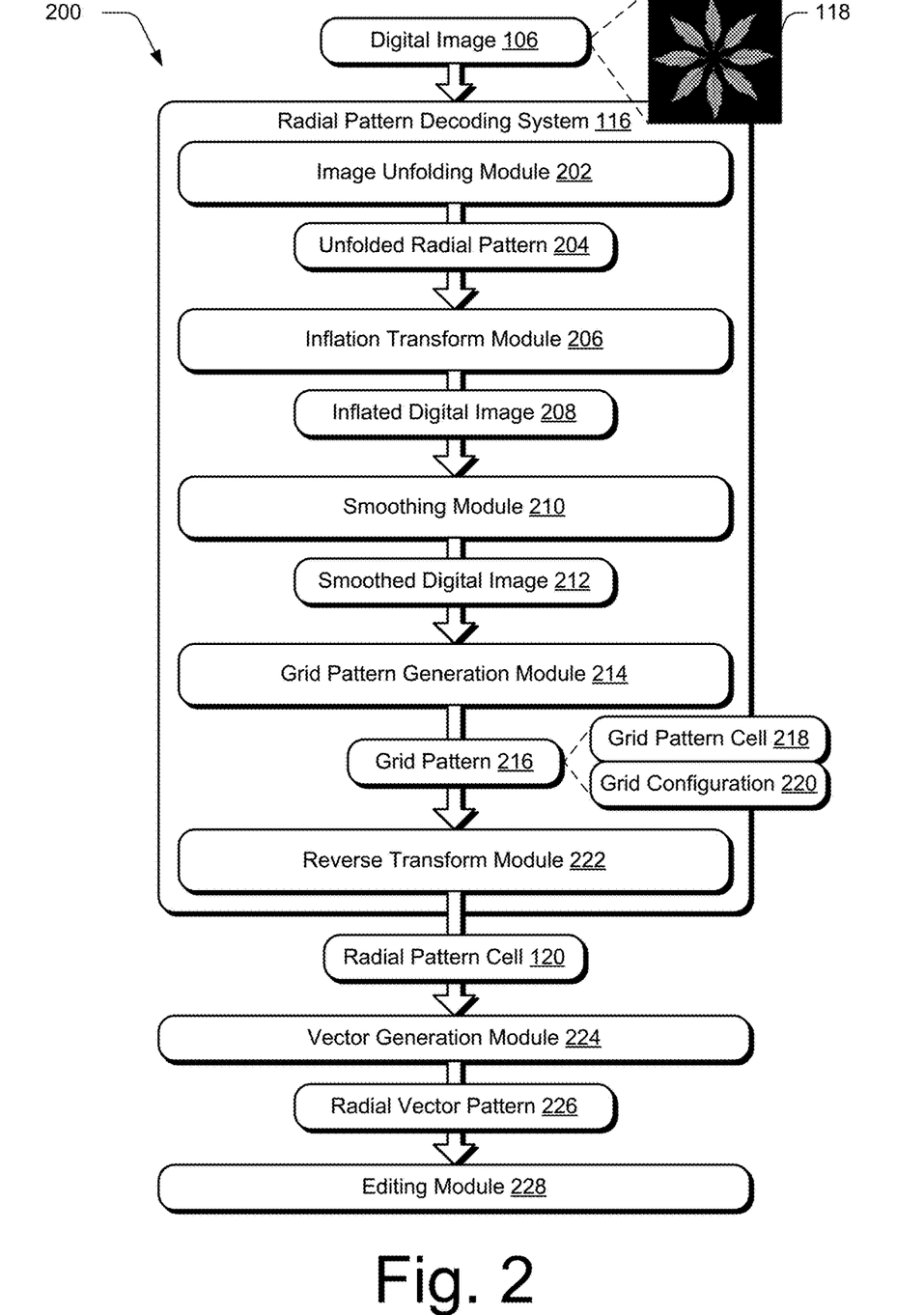
FIG. 2 depicts an example implementation showing operation of a radial pattern decoding system of FIG. 1 in greater detail.

FIG. 2 depicts an example implementation 200 showing operation of a radial pattern decoding system of FIG. 1 in greater detail. To begin in this example, a digital image 106 is received as an input by the radial pattern decoding system 116. The digital image 106 includes a radial pattern 118 that is used as a basis to generate a radial pattern cell 120.

An image unfolding module 202 is employed to form an unfolded radial pattern 204 by unfolding the radial pattern 118 in the digital image 106 (block 802). The image unfolding module 202, for instance, is representative of functionality to implement an unfold transformation. To do so, the image unfolding module 202 identifies a center of the radial pattern 118. The radial pattern 118 is formed as a collection of multiple concentric arcs of pixels. A radius "$r_0$" of an outermost circle is defined as "min(w, h)," where "w" and "h" are width and height of the digital image 106, respectively.

When moving towards the center of the radial pattern 118 from the outermost circle, the circumference of concentric circles of pixels decrease by "$2*\pi$" at each step and after "$r_0$" steps, the radius and hence the circumference drops to zero. The image unfolding module 202 unfolds each circle of pixels and copies the pixels to another digital image of width "$2*\pi*r_0$" and height "$r_0$." In an implementation, the digital image having the unfolded radial pattern 204 has "$2*\pi*r_0$" pixels marked in a top row, "$2*\pi*(r_0-1)$" marked pixels in the row next to the top, "$2*\pi*(r_0-2)$" pixels in a subsequent row, and none in a bottom row. The unfolded radial pattern 204 thereby results is an inverted triangle of pixels with a center of the radial pattern 118 defining a point of the triangle and an arc from the outermost radius have a circumference defining a base of the triangle.

Figure 3:
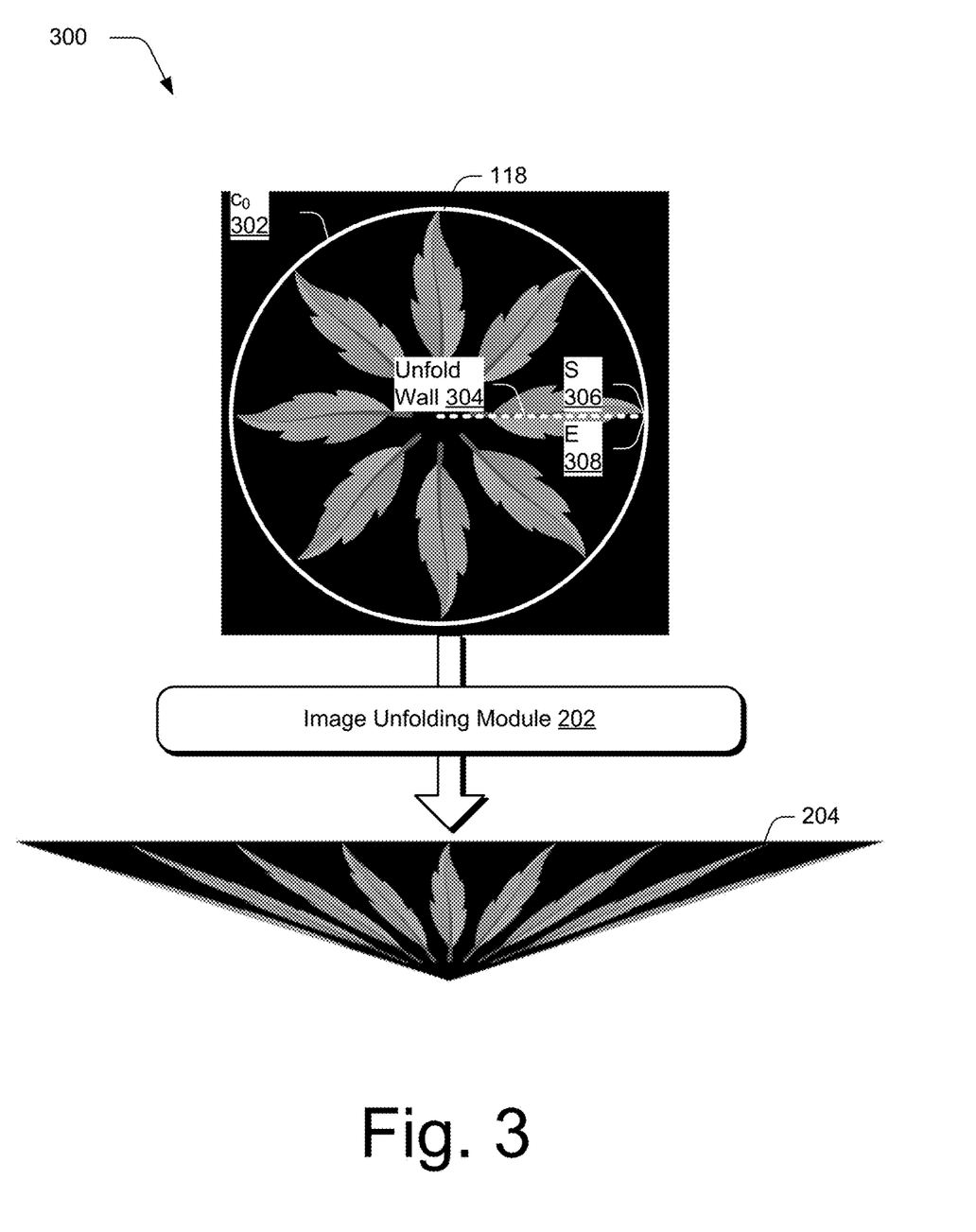
FIG. 3 depicts a system showing operation of an image unfolding module of FIG. 2 in greater detail.

FIG. 3 depicts a system 300 showing operation of an image unfolding module 202 of FIG. 2 in greater detail. In the illustrated example $r_0$ 302 defines an outermost radius. An unfold wall 304 is depicted as a dashed line, along with a starting point "S" 306 and an end point "E" 308 of the unfold transformation. The circumference $c_0$ 302 decreases by one pixel as moving inwards toward a center of the radial pattern 118.

The unfold wall 304 is defined as a line connecting a center of the radial pattern 118 and the circumference $c_0$ 302. The unfold wall 304 indicates a location at which the radial pattern 118 of the digital image 106 for opening up the digital image from the center and moving outwards and upwards on both sides to straighten an outer surface of the radial pattern 118. Because each successive circle in the radial pattern 118 drops in its circumference measurement by "2*π" pixels, the straightened result of the unfolded radial pattern 204 forms a triangle, e.g., an inverted triangle.

The unfolded radial pattern 204 is then passed as an input from the image unfolding module 202 to an inflation transformation module 206. The inflation transformation module 206 is configured to generate an inflated digital image 208 by upsampling the unfolded radial pattern 204 (block 804). The inflation transformation module 206, for instance, is configured to apply a progressive inflation transformation to rows of the unfolded radial pattern 204, e.g., which may exclude a final row that includes the radius $r_0$ 202. The inflation transformation inflates each row to "$2*\pi*r_0$" pixels, thereby converting an inverted triangle of the unfolded radial pattern 204 into a rectangle as the inflated digital image 208, e.g., in which each of the rows are of equal length. Bilinear interpolation is utilized, in an example, to inflate each row to find values for "missing" pixels, e.g., based on color values for neighboring pixels.

Figure 4:
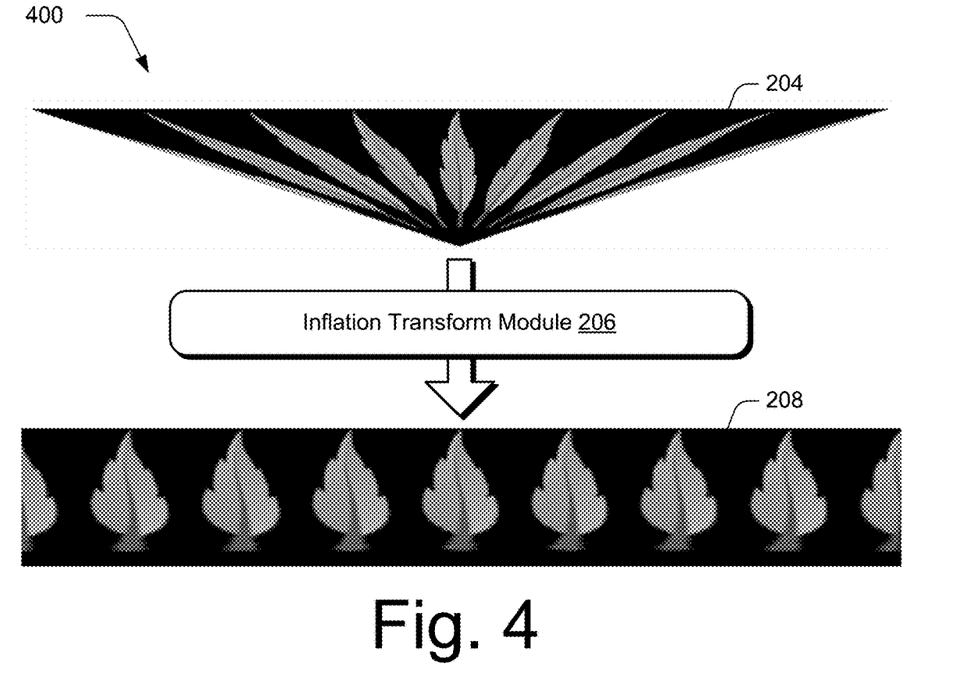
FIG. 4 depicts a system showing operation of an inflation transform module of FIG. 2 in greater detail.

FIG. 4 depicts a system 400 showing operation of an inflation transform module 206 of FIG. 2 in greater detail. Because each row of the inverted triangle of the unfolded radial pattern 204 has a deficit of "2*π" pixels from a preceding row, the inflation transformation module 206 is configured to "inflate" the row by an amount of the shortfall by performing a linear upsampling to compute values of missing pixels.

To do so, the inflation transformation module 206 finds a fractional location "k" in a corresponding row of the inverted triangle of the unfolded radial pattern 204. The inflation transformation module 206 then takes a value of pixel to the left "$(k_L)$" and to the right "$(k_U)$" and interpolates these values to obtain a value of a corresponding pixel to be added for "missing" pixels in the row. For a "$j^{th}$" pixel in the "$i^{th}$" row the following expression holds:

$$P_T[i][j] = (1-t)*P_S[i][k_L] + t*P_S[i][k_U]$$

$$k = i*\pi + \frac{j}{R}$$

$$R = \frac{2*\pi*r_0}{2*\pi*r_i} = \frac{r_0}{r_i}$$

$$k_L = \lfloor k \rfloor, k_U = \lceil k \rceil$$

where, "$P_S$" and "$P_T$" respectively represent source and target image pixel values at a subscripted location. "R" is a ratio of topmost row's width to "$i^{th}$" row's width, "$\lfloor k \rfloor$" and "$\lceil k \rceil$" represent a mathematical floor and ceiling of "k." Other types of upsampling techniques may also be employed such as bilinear and cubic interpolation.

In the illustrated example of FIG. 2, the inflated digital image 208 is then passed as an input to a smoothing module 210 to generate a smoothed digital image 212. In some scenarios, inflation of the unfolded radial pattern 204 to generate the inflated digital image 208 results in visual artifacts, e.g., resulting from sharp frequency points. To address this, the smoothing module 210 is configured to perform a smoothing transform, e.g., by applying a "5*5" Gaussian blur filter.

Figure 5:
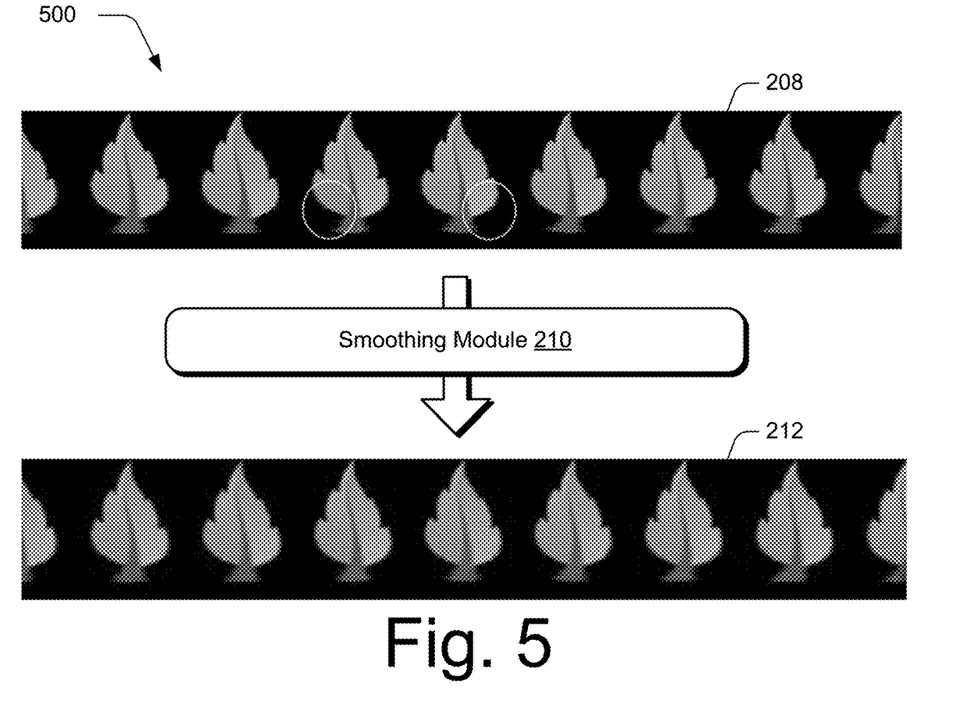
FIG. 5 depicts a system showing operation of a smoothing module of FIG. 2 in greater detail.

FIG. 5 depicts a system 500 showing operation of a smoothing module 210 of FIG. 2 in greater detail. As illustrated for the inflated digital image 208, sharp edges and inconsistencies are viewable, examples of which are circled in the illustration. These inconsistencies disrupt subsequent pattern detection techniques because structural fingerprints used as a basis for pattern detection that are based on detection of similar pixels start to experience significant deviations. Accordingly, a smoothing transformation is applied (e.g., as Gaussian blur smoothening), a result of which is depicted as a smoothed digital image 212.

The smoothed digital image 212 is then passed as an input to a grid pattern generation module 214. The grid pattern generation module 214 is configured to generate a grid pattern 216 (block 806) based on the inflated digital image 208, which may be smoothed. The grid pattern 216 defines a grid pattern cell 218 and a grid configuration 220. The grid pattern cell 218 define a minimal repeatable object in the rectangular digital image and the grid configuration 220 defines a configuration of that grid pattern cell 218 within the rectangular digital image, i.e., the smoothed digital image 212 generated from the inflated digital image 208.

Figure 6:
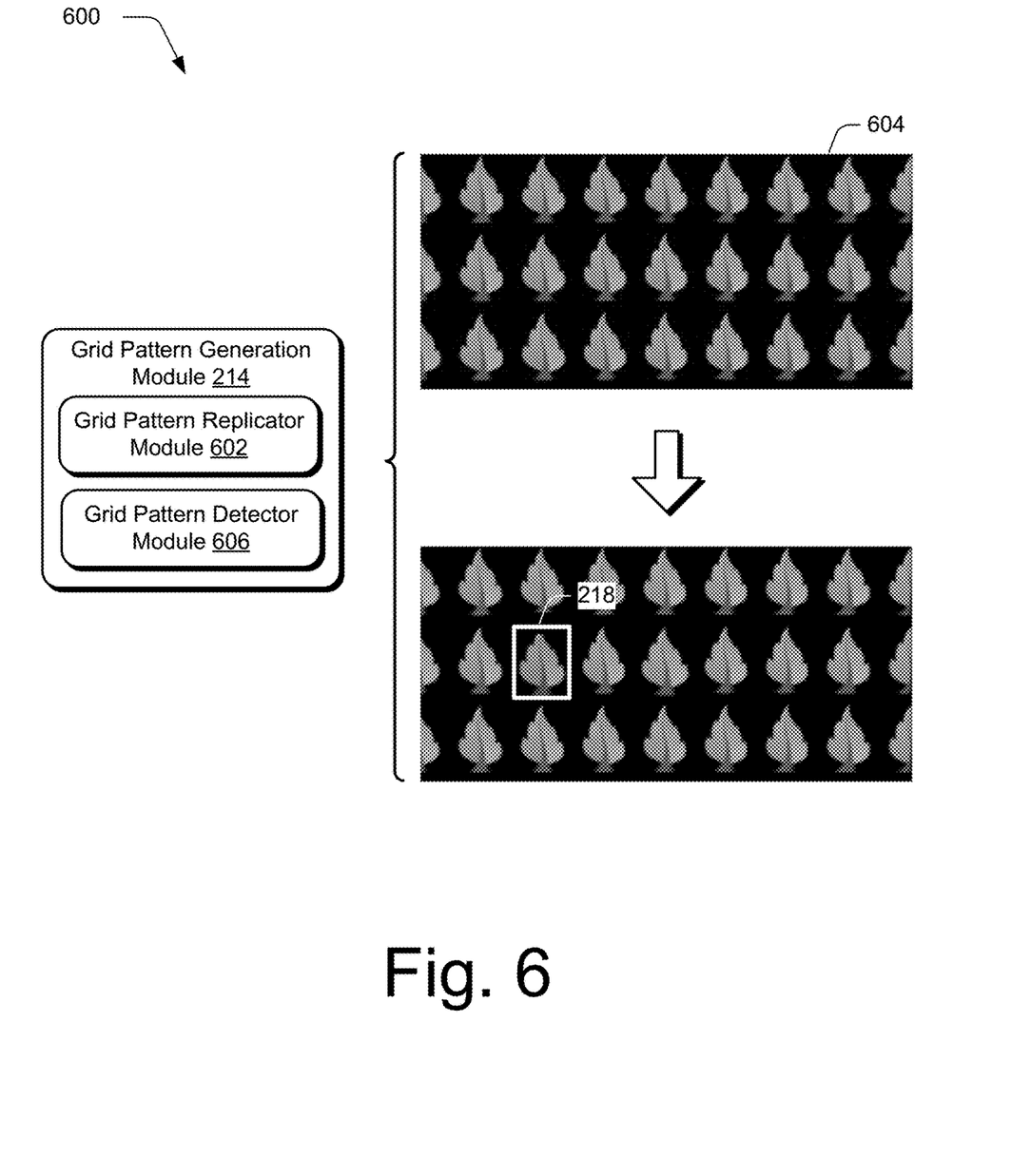
FIG. 6 depicts a system showing operation of a grid pattern generation module of FIG. 2 in greater detail.

FIG. 6 depicts a system 600 showing operation of a grid pattern generation module 214 of FIG. 2 in greater detail. The smoothed digital image 212 defines a single row grid pattern in this example. However, grid pattern detection is typically configured for detecting two-dimensional patterns. Accordingly, a grid pattern replicator module 602 is employed to replicate the single row grid pattern twice in this example to form a replicated pattern digital image 604 having three rows. A grid pattern detector module 606 is then employed to detect the grid pattern cell 218, which includes use of gutter squeezing and human perception optimization techniques. Examples of grid pattern detection techniques includes use of a Hough transform, corner detection (e.g., Harris Corner Detection), Fourier transforms, morphological operations, template matching, use of machine-learning networks (e.g., convolutional neural networks), clustering techniques, detecting and recovering patterns in digital raster images as recited in U.S. patent application Ser. No. 17/932,478 which is hereby incorporated by reference in its entirety, and so on.

A radial pattern cell 120 is then generated by a reverse transform module 222 based on the grid pattern 216 (block 808). The grid pattern 216 obtained from the grid pattern generation module 214 provides a starting location and extents of the grid pattern cell 218 in a transformed space due to the unfolding and progressive inflation transforms. Accordingly, the reverse transform module 222 is configured to reverse transform the starting and ending "X" offsets from this transformed space to an original radial space of the digital image 106 in order to generate the radial pattern cell 120. In this example, X-axis data is meaningful for mapping back to radial space, e.g., the Y-axis image was generated by replication by the grid pattern generation module 214.

Using the unfold wall 302 from FIG. 3 and width of inflated digital image 208 (e.g., "$2*\pi*r0$"), the reverse transform module 222 computes a polar coordinate angle (e.g., in radial space) corresponding to an "X" location in rectangular space. With starting and ending "X" locations of the grid pattern cell 218 mapped to radial space, the radial pattern cell 120 is generated as a pie-shaped cell in the digital image 106.

Figure 7:
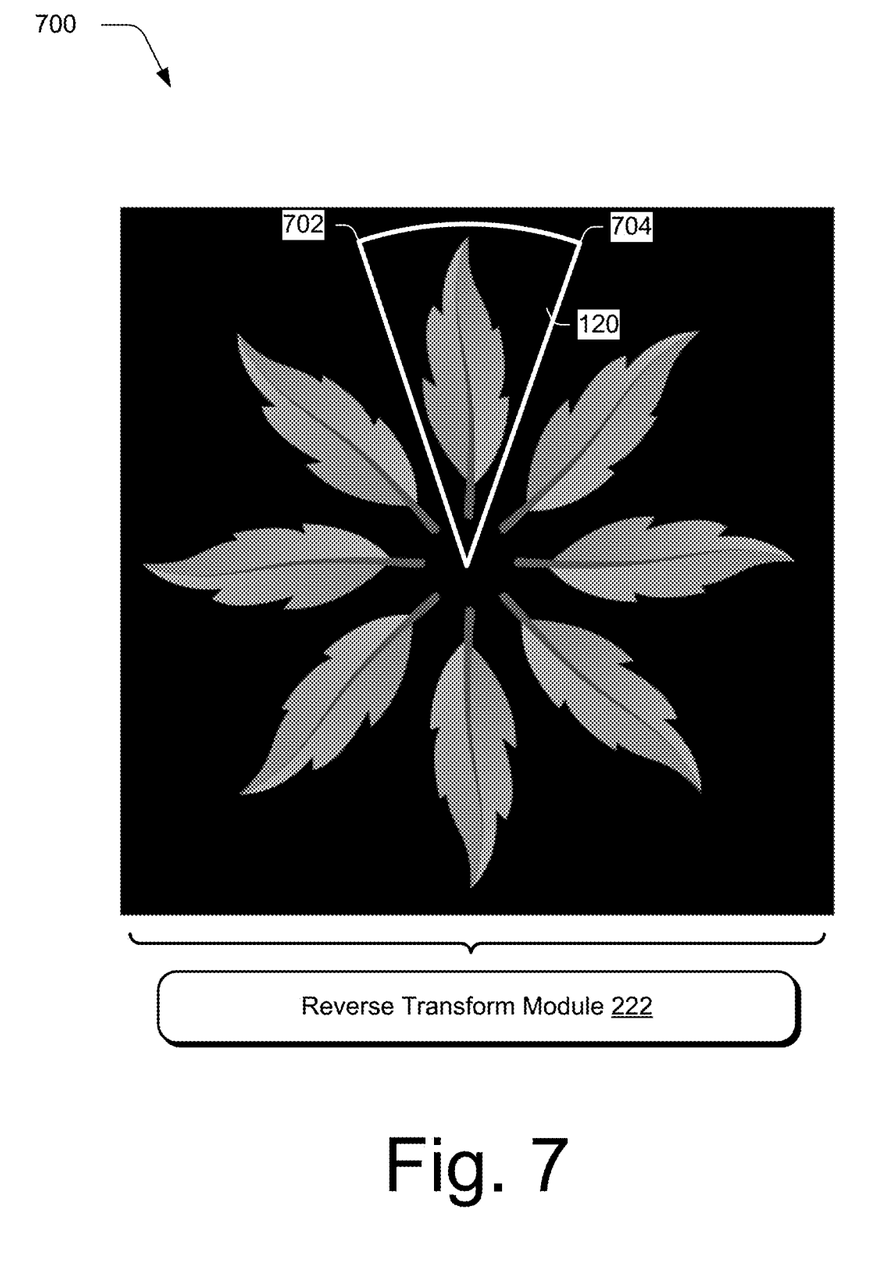
FIG. 7 depicts a system showing operation of a reverse transform module of FIG. 2 in greater detail.
Figure 8:
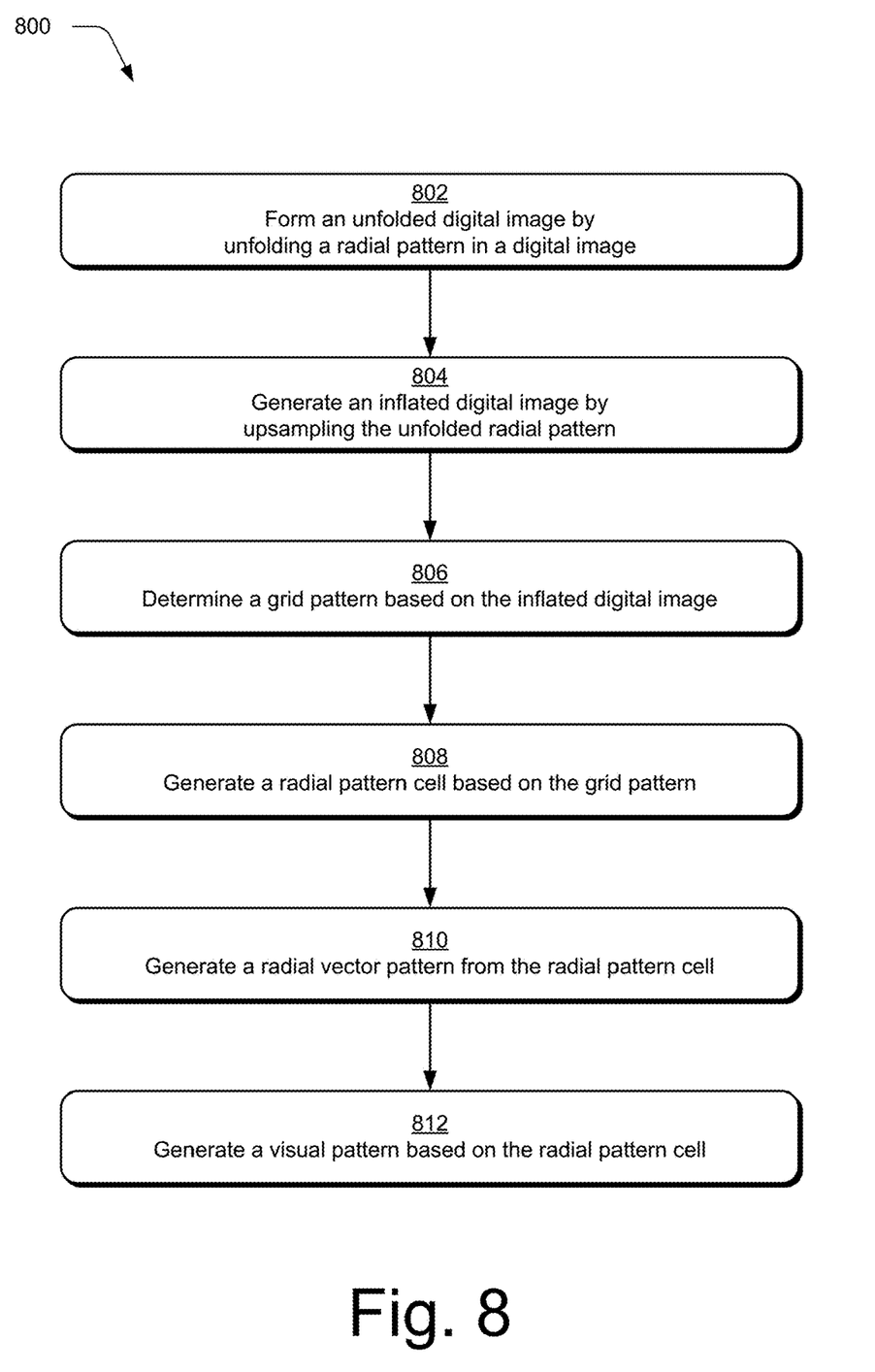
FIG. 8 is a flow diagram depicting an algorithm as a step-by-step procedure in an example implementation of operations performable for accomplishing a result of radial pattern decoding from a digital image.

FIG. 7 depicts a system 700 showing operation of a reverse transform module 222 of FIG. 2 in greater detail. In this example, instead of reverse transforming the grid pattern cell 218, itself, location and extent are translated as part of the reverse transformation. Corresponding pixel data is then obtained from corresponding pixels in the digital image 106, i.e., the original input. The "X" coordinates of grid pattern cell's 218 start and end location respectively give a start angle 702 and end angle 704 as polar coordinate angles in the original digital image 106. The start and end angles 702 704 define a pie section emanating from the center of the input image as the radial pattern cell 120.

In an implementation, pixels belonging to this pie section define the radial pattern cell 120 and are copied into a new rectangular image of sufficient size. This image along with its configuration (e.g., start angle 702 and end angle 704 in radial coordinates) form the basis of creating additional visual patterns.

In one example, a vector generation module 224 is configured to generate a radial vector pattern 226 from the radial pattern cell 120 (block 810). The vector generation module 224, for instance, is usable to employ image tracing, generation of a trace bitmap, and so forth. The radial vector pattern 226 is then usable to generate a visual pattern by an editing module 228 based on the radial pattern cell 120 (block 812), e.g., using the radial vector pattern 226. The radial pattern cell 120, for example, may be replicated and resized to support a variety of different types of visual patterns as shown in the user interface 110 of FIG. 1.

Example System and Device

Figure 9:
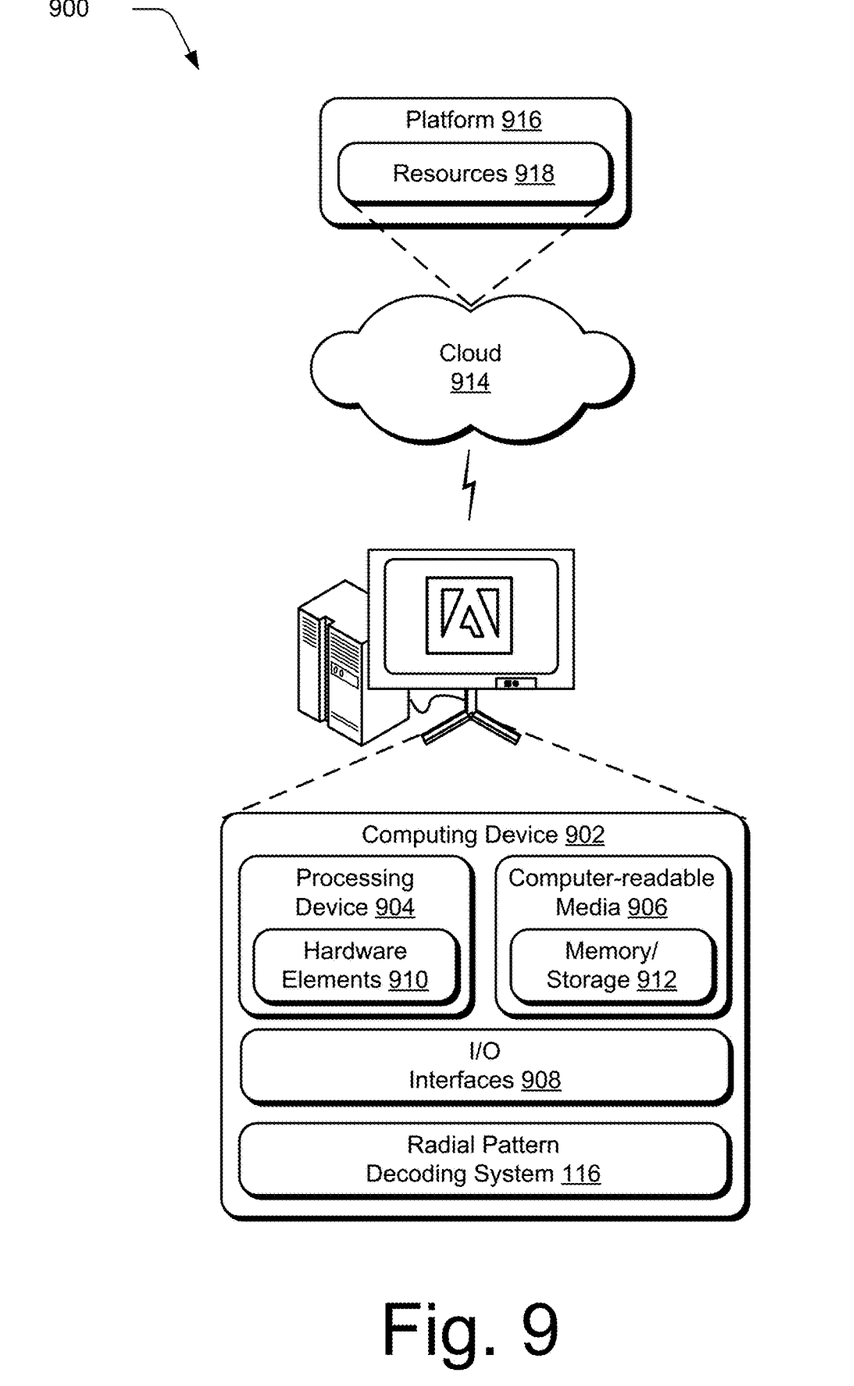
FIG. 9 illustrates an example system including various components of an example device that can be implemented as any type of computing device as described and/or utilize with reference to FIGS. 1-8 to implement embodiments of the techniques described herein.

FIG. 9 illustrates an example system generally at 900 that includes an example computing device 902 that is representative of one or more computing systems and/or devices that implement the various techniques described herein. This is illustrated through inclusion of the radial pattern decoding system 116. The computing device 902 is configurable, for example, as a server of a service provider, a device associated with a client (e.g., a client device), an on-chip system, and/or any other suitable computing device or computing system.

The example computing device 902 as illustrated includes a processing device 904, one or more computer-readable media 906, and one or more I/O interface 908 that are communicatively coupled, one to another. Although not shown, the computing device 902 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 904 is representative of functionality to perform one or more operations using hardware. Accordingly, the processing device 904 is illustrated as including hardware element 910 that is configurable as processors, functional blocks, and so forth. This includes implementation in hardware as an application specific integrated circuit or other logic device formed using one or more semiconductors. The hardware elements 910 are not limited by the materials from which they are formed, or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 906 is illustrated as including memory/storage 912 that stores instructions that are executable to cause the processing device 904 to perform operations. The memory/storage 912 represents memory/storage capacity associated with one or more computer-readable media. The memory/storage 912 includes volatile media (such as random access memory (RAM)) and/or nonvolatile media (such as read only memory (ROM), Flash memory, optical disks, magnetic disks, and so forth). The memory/storage 912 includes fixed media (e.g., RAM, ROM, a fixed hard drive, and so on) as well as removable media (e.g., Flash memory, a removable hard drive, an optical disc, and so forth). The computer-readable media 906 is configurable in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 902. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 902, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 910. The computing device 902 is configured to implement particular instructions and/or functions corresponding to the software and/or hardware modules. Accordingly, implementation of a module that is executable by the computing device 902 as software is achieved at least partially in hardware, e.g., through use of computer-readable storage media and/or hardware elements 910 of the processing device 904. The instructions and/or functions are executable/operable by one or more articles of manufacture (for example, one or more computing devices 902 and/or processing devices 904) to implement techniques, modules, and examples described herein.

The techniques described herein are supported by various configurations of the computing device 902 and are not limited to the specific examples of the techniques described herein. This functionality is also implementable all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 include applications and/or data that can be utilized while computer processing is executed on servers that are remote from the computing device 902. Resources 918 can also include services provided over the Internet and/or through a subscriber network, such as a cellular or Wi-Fi network.

The platform 916 abstracts resources and functions to connect the computing device 902 with other computing devices. The platform 916 also serves to abstract scaling of resources to provide a corresponding level of scale to encountered demand for the resources 918 that are implemented via the platform 916. Accordingly, in an interconnected device embodiment, implementation of functionality described herein is distributable throughout the system 900. For example, the functionality is implementable in part on the computing device 902 as well as via the platform 916 that abstracts the functionality of the cloud 914.

In implementations, the platform 916 employs a "machine-learning model" that is configured to implement the techniques described herein. A machine-learning model refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    forming, by a processing device, an unfolded digital image by unfolding a radial pattern in a digital image that is two-dimensional;
    generating, by the processing device, an inflated digital image by upsampling the unfolded radial pattern;
    determining, by the processing device, a grid pattern based on the inflated digital image;
    generating, by the processing device, a radial pattern cell based on a reverse transform of the grid pattern; and
    generating, by the processing device, a visual pattern based on the radial pattern cell.

2. The method as described in claim 1, wherein the radial pattern includes a center and a radius and the unfolding includes:
    defining an unfold wall as a line between the center and the radius; and
    opening up the radial pattern from the center on both sides of the unfold wall.

3. The method as described in claim 1, wherein the radial pattern includes a center and a radius and the unfolding includes forming a triangle having a point defined by the center and a base defined by a circumference at the radius.

4. The method as described in claim 3, wherein the upsampling includes:

determining a number of pixels to be added to each row based a fractional location of the row of the triangle between the point and the base; and interpolating values for the number of pixels based on neighboring pixels within the triangle.

5. The method as described in claim 1, wherein:

the unfolding includes forming a triangle defined by a center of the radial pattern and a base defined by a circumference at a radius of the radial pattern; and the inflated digital image is formed as a rectangle.

6. The method as described in claim 1, further comprising smoothing the inflated digital image and wherein the generating of the grid pattern is formed using the smoothed digital image.

7. The method as described in claim 1, wherein the determining the grid pattern includes:

forming a replicated digital image based on the inflated digital image; and detecting the grid pattern from the replicated digital image.

8. The method as described in claim 1, wherein the grid pattern includes a grid pattern cell and a grid configuration.

9. The method as described in claim 8, wherein the generating of the radial pattern cell as the reverse transform of the grid pattern includes mapping the grid pattern cell to a radial space defined by the radial pattern in the digital image.

10. The method as described in claim 1, wherein the generating of the radial pattern cell is based on polar coordinate angles defining a radial repeat configuration.

11. The method as described in claim 1, further comprising generating a radial vector pattern by vectorizing the radial pattern cell.

12. A computing device comprising:

a processing device; and a computer-readable storage medium storing instructions that, responsive to execution by the processing device, causes the processing device to perform operations including;

forming a triangle from a radial pattern having a center and a radius in a digital image;

generating a rectangle from the triangle by;

determining a number of pixels to be added to each row of the triangle based on a fractional location of the row between the center and the radius in the radial pattern; and interpolating values for the number of pixels based on neighboring pixels within the triangle; and generating a radial pattern cell by mapping a grid pattern from the rectangle to a radial space defined by the radial pattern in the digital image.

13. The computing device as described in claim 12, wherein the forming of the triangle includes:

defining an unfold wall as a line between the center and the radius of the radial pattern; and opening up the radial pattern from the center on both sides of the unfold wall.

14. The computing device as described in claim 12, wherein the operations further comprise smoothing the rectangle and the grid pattern is formed using the smoothed rectangle.

15. The computing device as described in claim 12, further comprising:

forming a replicated digital image based on the rectangle; and detecting the grid pattern from the replicated digital image as a grid pattern cell and a grid configuration.

16. The computing device as described in claim 12, wherein the mapping of the grid pattern to the radial space defined by the radial pattern in the digital image is performed as a reverse transform.

17. The computing device as described in claim 12, wherein the operations further comprise generating a radial vector pattern by vectorizing the radial pattern cell.

18. One or more computer-readable storage media storing instructions that, responsive to execution by a processing device, causes the processing device to perform operations including:

forming an unfolded digital image by unfolding a radial pattern in a digital image that is two-dimensional;

generating an inflated digital image by upsampling the unfolded radial pattern;

generating a grid pattern based on the inflated digital image; and generating a radial pattern cell by mapping the grid pattern to a radial space defined by the digital image.

19. The one or more computer-readable storage media as described in claim 18, wherein the generating of the radial pattern cell is performed as a reverse transform of the grid pattern.

20. The one or more computer-readable storage media as described in claim 18, wherein the generating of the inflated digital image includes determining a number of pixels to be added to each row of the unfolded digital image based a fractional location of the row between a center and a base of the radial pattern.

* * * * *